United States Patent
Zhao et al.

(10) Patent No.: US 12,096,404 B2
(45) Date of Patent: Sep. 17, 2024

(54) METHODS AND DEVICES FOR DATA TRANSMISSION

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 547 days.

(21) Appl. No.: 17/352,190

(22) Filed: Jun. 18, 2021

(65) Prior Publication Data
US 2021/0314923 A1    Oct. 7, 2021

Related U.S. Application Data

(63) Continuation of application No. PCT/CN2018/122584, filed on Dec. 21, 2018.

(51) Int. Cl.
*H04W 72/04*  (2023.01)
*H04L 1/1812*  (2023.01)
*H04W 4/46*  (2018.01)

(52) U.S. Cl.
CPC ........... *H04W 72/04* (2013.01); *H04L 1/1812* (2013.01); *H04W 4/46* (2018.02)

(58) Field of Classification Search
CPC ...... H04W 72/04; H04W 4/46; H04L 1/1812; H04L 5/0044; H04L 5/0064; H04L 5/0078; H04L 5/0091
See application file for complete search history.

(56) References Cited

U.S. PATENT DOCUMENTS

| | | | |
|---|---|---|---|
| 2015/0215981 A1* | 7/2015 | Patil | H04W 72/02 370/329 |
| 2015/0264677 A1* | 9/2015 | He | H04L 5/0069 370/312 |

(Continued)

FOREIGN PATENT DOCUMENTS

| | | |
|---|---|---|
| CN | 102858012 A | 1/2013 |
| CN | 103763744 A | 4/2014 |

(Continued)

OTHER PUBLICATIONS

Initial Cellular V2X Standard Completed, A Global Initiative; Dino Flore; 3GPP RAN Chairman; Sep. 26, 2016; 3 pages.

(Continued)

*Primary Examiner* — Tejis Daya
(74) *Attorney, Agent, or Firm* — Young Basile Hanlon & MacFarlane, P.C.

(57) ABSTRACT

Methods for data transmission are provided. A method for data transmission includes the following. A first terminal device determines a first transmission mode. The first terminal device performs data transmission using the first transmission mode. A terminal device is applicable to device to device (D2D) communication and operable as a first terminal device, and the first terminal device includes at least one processor, a transceiver; and a memory storing instructions which, when executed by the at least one processor, cause the at least one processor to perform the method.

12 Claims, 5 Drawing Sheets

(56) References Cited

U.S. PATENT DOCUMENTS

| | | | | |
|---|---|---|---|---|
| 2015/0327314 A1* | 11/2015 | Liu | ....................... | H04W 72/20 |
| | | | | 370/329 |
| 2016/0044729 A1 | 2/2016 | Tu et al. | | |
| 2017/0150501 A1* | 5/2017 | Park | ................... | H04W 72/0446 |
| 2018/0070371 A1* | 3/2018 | Shin | ....................... | H04W 72/23 |
| 2018/0091265 A1* | 3/2018 | Liu | .......................... | H04L 1/08 |
| 2018/0212746 A1* | 7/2018 | Kazmi | ...................... | H04L 5/14 |
| 2021/0127385 A1* | 4/2021 | Kung | ................... | H04L 1/1896 |
| 2022/0360414 A1* | 11/2022 | Liu | ......................... | H04L 1/188 |

FOREIGN PATENT DOCUMENTS

| | | | | |
|---|---|---|---|---|
| CN | 105554689 A | 5/2016 | | |
| WO | WO-2017099837 A1 * | 6/2017 | ............ | H04W 68/00 |

OTHER PUBLICATIONS

International Search Report with English Translation for PCT/CN2018/122584 mailed Sep. 19, 2019.

* cited by examiner

400

A FIRST TERMINAL DEVICE DETERMINES A FIRST TRANSMISSION MODE — 410

THE FIRST TERMINAL DEVICE PERFORMS DATA TRANSMISSION USING THE FIRST TRANSMISSION MODE — 420

US 12,096,404 B2

METHODS AND DEVICES FOR DATA TRANSMISSION

CROSS-REFERENCE TO RELATED APPLICATION(S)

This application is a continuation of International Application No. PCT/CN2018/122584, filed on Dec. 21, 2018, the disclosure of which is hereby incorporated by reference in its entirety.

TECHNICAL FIELD

This disclosure relates to the field of communication, and more particularly to methods and devices for data transmission.

BACKGROUND

Internet of vehicles (IoV) (also referred to as vehicle to everything (V2X)) communication adopts a device to device (D2D)-based sidelink (SL) transmission technology. Different from a traditional long term evolution (LTE) system in which data are received or sent via a base station, an IoV system adopts a direct terminal-to-terminal communication, and therefore has a higher spectrum efficiency and lower transmission delay.

In 5th generation (5G) (that is, new radio (NR)) V2X (NR-V2X) communication, a terminal device can use a specific transmission mode for data transmission. For example, in transmission Mode 1, the terminal device can transmit data on a transmission resource configured by a network device. In transmission Mode 2d, the terminal device can transmit data on a transmission resource configured by other terminal devices. However, when the communication environment of the terminal device changes, the terminal device may be unable to continue to efficiently obtain a transmission resource. For example, when the terminal device in transmission Mode 2d is unable to receive resource allocation information sent by other terminal devices due to change in geographic location or the like, the terminal device will be unable to continue data transmission.

SUMMARY

Implementations provide methods and devices for data transmission. As such, a terminal device can flexibly determine a transmission mode to be used, to achieve data transmission efficiently.

In a first aspect, a method for data transmission is provided. The method is applicable to device to device (D2D) communication. The method includes the following. A first terminal device determines a first transmission mode. The first terminal device performs data transmission using the first transmission mode.

In a second aspect, a terminal device is provided. The terminal device is applicable to device to device (D2D) communication and being operable as a first terminal device. The first terminal device includes at least one processor, a transceiver, and a memory. The memory is configured to store instructions which, when executed by the at least one processor, cause the at least one processor to determine a first transmission mode and cause the transceiver to perform data transmission using the first transmission mode determined by the at least one processor.

DETAILED DESCRIPTION

The following will describe technical solutions of implementations with reference to the accompanying drawings.

The technical solutions of implementations are applicable to various communication systems, for example, a global system of mobile communication (GSM), a code division multiple access (CDMA) system, a wideband code division multiple access (WCDMA) system, an LTE system, an LTE frequency division duplex (LTE-FDD) system, an LTE time division duplex (LTE-TDD) system, a universal mobile telecommunication system (UMTS), or a 5G system.

In the disclosure, various implementations are described in connection with a terminal device. The terminal device may refer to a user equipment (UE), an access terminal, a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a personal digital assistant (PDA), a handheld device with wireless communication functions, a computing device, other processing devices coupled with a wireless modem, an in-vehicle device, a wearable device, a terminal device in a 5G network, a terminal device in a future evolved public land mobile network (PLMN), etc.

In the disclosure, various implementations are described in connection with a network device. The network device may be a device for communicating with a terminal device. The network device may be, for example, a base transceiver station (BTS) in the GSM or in the CDMA system, or may be a NodeB (NB) in the WCDMA system, or may be an evolutional Node B (eNB or eNodeB) in the LTE system. Alternatively, the network device may be a relay station, an access point, an in-vehicle device, a wearable device, a network-side device in the 5G network, or a network device in the future evolved PLMN.

Figure 1:
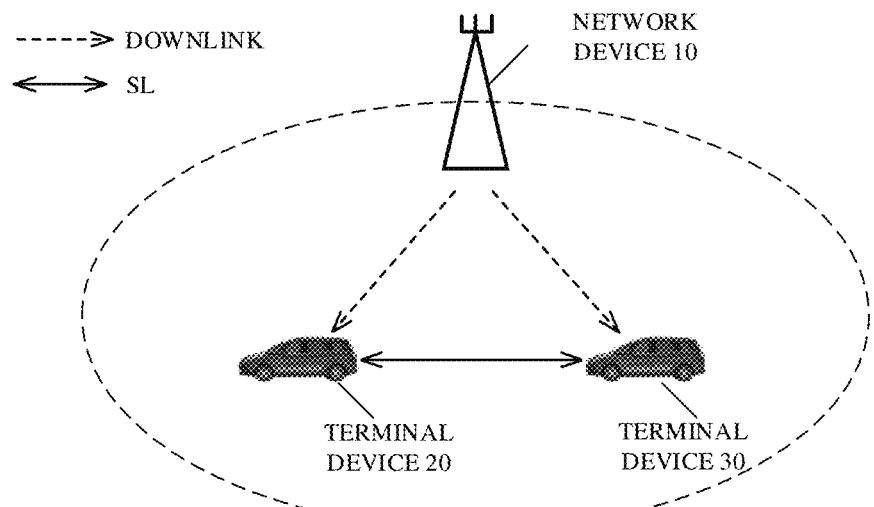
FIG. 1 is a schematic architectural diagram illustrating an application scenario according to implementations.
Figure 2:
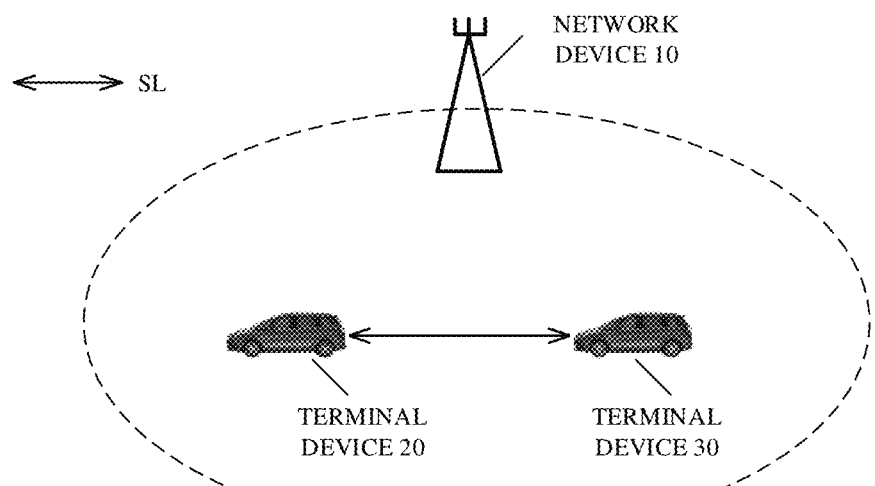
FIG. 2 is a schematic architectural diagram illustrating an application scenario according to other implementations.

FIG. 1 and FIG. 2 are schematic diagrams illustrating application scenarios of implementations. FIG. 1 exemplarily illustrates one network device and two terminal devices. A wireless communication system may also include multiple network devices, and there can be other numbers of terminal devices in a coverage area of each of the network devices, which is not limited herein.

In addition, the wireless communication system may further include a mobile management entity (MME), or other network entities such as a serving gateway (S-GW) or a packet data network gateway (P-GW), which is not limited herein.

Terminal device 20 and terminal device 30 can communicate with each other through D2D communication. During D2D communication, terminal device 20 and terminal device 30 directly communicate with each other through a D2D link, that is, an SL. For example, as illustrated in FIG. 1 or FIG. 2, terminal device 20 and terminal device 30 directly communicate with each other through an SL. As illustrated in FIG. 1, terminal device 20 and terminal device 30 communicate with each other through an SL, in which a transmission resource is allocated by a network device. As illustrated in FIG. 2, terminal device 20 and terminal device 30 communicate with each other through an SL, in which a transmission resource is selected by terminal device 20 and terminal device 30 instead of being allocated by the network device.

D2D communication can refer to vehicle to vehicle (V2V) communication or V2X communication. In V2X communication, X may generally refer to any device with wireless receiving and transmitting capabilities, for example (but not limited to), a wireless device that moves slowly, a vehicle-mounted device that moves quickly, a network control node with wireless transmitting and receiving capabilities, or the like. It should be understood that implementations herein are mainly applied to a V2X communication scenario, but it can also be applied to any other D2D communication scenario, which is not limited herein.

In 3rd generation partnership project (3GPP) Rel-14, two transmission modes are defined, namely Mode 3 and Mode 4. In Mode 3, a transmission resource of a terminal device is allocated by a base station. The terminal device can transmit data on an SL by using a resource allocated by the base station. The resource allocated by the base station to the terminal device may be a resource used for a single transmission or a resource used for semi-static transmission. In Mode 4, if the terminal device has sensing capabilities, the terminal device can conduct data transmission in a manner of "sensing+reservation". Otherwise, the terminal device can randomly select a transmission resource from a resource pool. The terminal device which has sensing capabilities can obtain, through sensing, an available transmission resource set from a resource pool, and then randomly select a resource from the transmission resource set for data transmission. Since a service in an IoV system is periodic, the terminal device usually adopts a semi-static transmission mode, that is, the terminal device can select a transmission resource and continuously use the selected transmission resource in multiple transmission periods, which can reduce probability of resource reselection and probability of resource collision. The terminal device can carry, in control information of the current transmission, information indicative of a resource reserved for a next transmission, such that other terminal devices can determine, by detecting the control information, whether the resource has been reserved or used by the terminal device, thereby reducing probability of resource collision.

In 3GPP Rel-15, multiple transmission modes are introduced, for example, Mode 1 and Mode 2. In Mode 1, the terminal device uses a transmission resource allocated by the network device for data transmission, which is similar to Mode 3 in Rel-14. In Mode 2, the terminal device selects a transmission resource for data transmission. Mode 2 includes multiple sub-modes, such as Mode 2a, Mode 2b, Mode 2c. Mode 2d, etc. In addition, there may also be other transmission modes.

In Mode 2a, the terminal device can autonomously select a resource for data transmission. For example, the terminal device can autonomously select, through random selection or resource sensing, a resource from a resource pool which is preconfigured or configured by the network device.

In Mode 2b, the terminal device can assist other terminal devices in resource selection. For example, the terminal device can send assist information to other terminal devices. The assist information may include some or all of the following: information of an available time-frequency resource, information of an available transmission resource set, channel measurement information, and channel quality information, such as channel state information (CSI), channel quality indicator (CQI), precoding matrix indicator (PMI), rank indication (RI), reference signal receiving power (RSRP), reference signal receiving quality (RSRQ), received signal strength indicator (RSSI), path loss information, etc.

In Mode 2c, the terminal device can select a resource from transmission resources configured for the terminal device. For example, the network device configures transmission resources for each terminal device. When the terminal device has SL data to transmit, the terminal device uses the transmission resource configured by the network device for data transmission.

In Mode 2d, the terminal device can allocate transmission resources to other terminal devices. For example, the terminal device may be a group header of a communication group, which can allocate to group members of the communication group time-frequency resources for SL transmission.

Figures 3, 4:
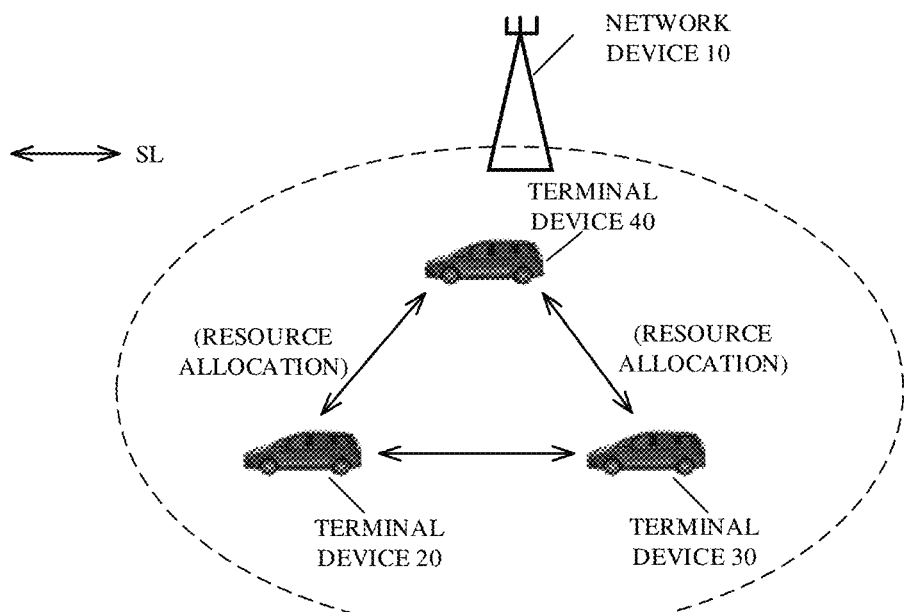
FIG. 3 is a schematic diagram illustrating resource allocation between terminal devices according to implementations.
FIG. 4 is a schematic flowchart of a method for data transmission according to implementations.

In NR-V2X communication, when communication environment of the terminal device changes, the terminal device may be unable to continue to efficiently obtain a transmission resource. For example, as illustrated in FIG. 3, suppose terminal device 20, terminal device 30 and terminal device 40 belong to a same communication group, where terminal device 20 and terminal device 30 are group members of the communication group, and terminal device 40 is a group header of the communication group. Terminal device 20, terminal device 30, and terminal device 40 each adopt Mode 2d described above, that is, terminal device 40 can allocate transmission resources to terminal device 20 and terminal device 30. However, for example, when terminal device 20 leaves the communication group due to change in geographic location or the like, terminal device 40 will be unable to continue allocating a transmission resource to terminal device 20, and as a result, terminal device 20 will be unable to transmit data normally.

Therefore, implementations provide a method for data transmission. As such, the terminal device can determine a proper transmission mode, such that the terminal device can still achieve data transmission efficiently even if communication environment changes.

"Information preconfigured" referred to herein refers to information agreed in advance (for example, information specified in a protocol), or information that is pre-defined or pre-stored. "Information configured by the network device" refers to information determined by the network device and indicated by the network device to the terminal device, or information configured by the network device for the terminal device. "Information configured by the terminal device" refers to information determined by the terminal device and indicated by the terminal device to other terminal devices, or information configured by the terminal device for other terminal devices.

FIG. 4 is a schematic flowchart of a method for data transmission according to implementations. The method illustrated in FIG. 4 may be implemented by a first terminal device. The first terminal device may be, for example, terminal device 20, terminal device 30, or terminal device 40 illustrated in FIG. 1, FIG. 2, or FIG. 3. The method is applicable to D2D communication.

As illustrated in FIG. 4, the method includes some or all of the following operations. At block 410, the first terminal device determines a first transmission mode.

At block 420, the first terminal device performs data transmission using the first transmission mode.

In some implementations, the first transmission mode is different from a second transmission mode which is used by the first terminal device before the first transmission mode is determined.

There is no limitation on the first transmission mode and the second transmission mode in implementations.

In some implementations, the first transmission mode may be Mode 2a described above. In the first transmission mode, a terminal device can autonomously select a transmission resource.

The second transmission mode may be Mode 2d described above. In the second transmission mode, a terminal device can determine a transmission resource according to resource allocation information from other terminal devices.

In other implementations, the second transmission mode may be Mode 1 described above. In the second transmission mode, a terminal device can determine a transmission resource according to resource allocation information from a network device.

According to implementations herein, instead of using a single transmission mode for data transmission, the first terminal device can flexibly determine a transmission mode to-be-used, by means of, for example, indication of the network device, a counter, or the like, to better meet communication requirements.

For example, the transmission mode currently used by the first terminal device is the second transmission mode. If the second transmission mode fails to meet data-transmission requirements of the first terminal device due to change in geographical location of the first terminal device or network fault, the first terminal device can determine a new transmission mode, for example, determine the first transmission mode and switch to the first transmission mode from the second transmission mode, to continue data transmission using the first transmission mode.

Therefore, by flexibly determining a proper transmission mode, the first terminal device can still transmit data efficiently even if communication environment changes.

Implementations provide two manners in which the first terminal device determines a transmission mode, which will be hereinafter described in detail.

Manner 1

In some implementations, the method further includes the following. The first terminal device receives first indication information, where the first indication information is used to determine the first transmission mode or used to indicate stopping allocating transmission resource to the first terminal device. The first terminal device determines the first transmission mode at block 410 as follows. The first terminal device determines the first transmission mode according to the first indication information.

According to implementations, a terminal device can determine, according to the first indication information sent by the network device or sent by other terminal devices, the first transmission mode to-be-used.

The first indication information may carry, for example, information of the first transmission mode. The first terminal device can determine the first transmission mode according to the first indication information. The first indication information may also be used to indicate stopping allocating transmission resource to the first terminal device by the network device or another terminal device. In this scenario, the first terminal device may autonomously switch to a default transmission mode, where the default transmission mode may be, for example, the first transmission mode. Alternatively, the default transmission mode may be pre-configured or configured by the network device.

In some implementations, the first terminal device receives the first indication information sent by the network device.

In some implementations, the first indication information may be carried in, for example, radio resource control (RRC) signaling, medium access control (MAC) signaling, a broadcast message, or download control information (DCI).

For example, the first terminal device performs SL transmission by using a transmission resource allocated by the network device. The first terminal device receives the first indication information sent by the network device, where the first indication information is used to indicate stopping allocating transmission resource to the first terminal device by the network device. In this scenario, the first terminal device switches to the default transmission mode, such as Mode 2a, to continue SL transmission.

For another example, the first terminal device performs SL transmission by using the transmission resource allocated by the network device. The first terminal device receives the first indication information sent by the network device, where the first indication information is used to determine the first transmission mode, such as Mode 2a. In this scenario, the first terminal device switches to Mode 2a indicated by the first indication information, to continue SL transmission.

In some implementations, the first indication information further includes identifier information of a terminal device which is configured to allocate a transmission resource to the first terminal device.

The identifier information carried in the first indication information may be identifier information of a terminal device which stops allocating transmission resource to the first terminal device, or may be identifier information of a terminal device which is configured to allocate a transmission resource to the first terminal device in a transmission mode to-be-used (that is, the first transmission mode).

The identifier information may be layer 2 identification (L2 ID) of the terminal device or radio network temporary identity (RNTI), where RNTI may be cell-RNTI (C-RNTI) or vehicle-RNTI (V-RNTI).

The identifier information of the terminal device may be carried in second indication information, where the second indication information is different from the first indication information.

For example, the first terminal device is a group member of a communication group, and a second terminal device is a group header of the communication group. The second terminal device can allocate a transmission resource to the first terminal device. When the second terminal device does not allocate a transmission resource to the first terminal device any more, the network device can send the first indication information to the first terminal device, where the first indication information is used to indicate stopping allocating transmission resource to the first terminal device by the second terminal device, and the identifier information, such as UE identify (UE ID), of the second terminal device is carried in the first indication information.

For another example, the first terminal device performs SL transmission by using the transmission resource allocated by the network device. The first terminal device receives the first indication information sent by the network device, where the first indication information is used to determine the first transmission mode, such as Mode 2d, and the identifier information of the second terminal device, which is configured to allocate, in Mode 2d, a transmission resource to the first terminal device, is carried in the first indication information. In this scenario, the first terminal device switches to Mode 2d according to the first indication information, and continues SL transmission according to resource allocation information sent by the second terminal device.

In other implementations, the first terminal device receives the first indication information sent by the second terminal device.

In some implementations, the second terminal device may be, for example, a terminal device which is configured to allocate a transmission resource to the first terminal device. The terminal device which is configured to allocate a transmission resource to the first terminal device may be a group header of a communication group to which the first terminal device belongs, or may be other terminal devices in the communication group.

In some implementations, the first terminal device receives the first indication information as follows. The first terminal device receives a first SL channel, where the first indication information is carried in the first SL channel.

In some implementations, the first SL channel may include, for example, any one of: a physical sidelink control channel (PSCCH) (where the first indication information may be carried in, for example, sidelink control information (SCI) in the first SL channel), a physical sidelink shared channel (PSSCH), and a physical sidelink broadcast channel (PSBCH).

In other implementations, the first terminal device receives the first indication information as follows. The first terminal device receives a sidelink radio resource control (S-RRC) signal, wherein the first indication information is carried in the S-RRC signal.

For example, the first terminal device is a group member of a communication group, and the second terminal device is a group header of the communication group. The second terminal device is configured to allocate a transmission resource to the first terminal device. When the second terminal device does not allocate a transmission resource to the first terminal device any more, the second terminal device can send the first indication information to the first terminal device, where the first indication information is used to indicate stopping allocating transmission resource to the first terminal device by the second terminal device. In this scenario, the first terminal device can switch to a default transmission mode, such as Mode 2a, to continue SL transmission. The second terminal device can send the SCI to the first terminal device, where the first indication information is carried in the SCI. Alternatively, the second terminal device can send the S-RRC to the first terminal device, where the first indication information is carried in the S-RRC.

For another example, the first terminal device is a group member of a communication group, and the second terminal device is a group header of the communication group. The second terminal device is configured to allocate a transmission resource to the first terminal device. When the second terminal device does not allocate a transmission resource to the first terminal device any more, the second terminal device can send the first indication information to the first terminal device, where the first indication information is used to determine the first transmission mode, such as Mode 2a. In this scenario, the first terminal device switches to Mode 2a indicated by the first indication information, to continue SL transmission. The second terminal device can send the SCI to the first terminal device, where the first indication information is carried in the SCI. Alternatively, the second terminal device can send the S-RRC to the first terminal device, where the first indication information is carried in the S-RRC.

Manner 2

In some implementations, the first terminal device determines the first transmission mode at block 410 as follows. The first terminal device determines the first transmission mode according to a counter.

In some implementations, the first terminal device determines the first transmission mode according to the counter as follows. The first terminal device starts (or restarts) the counter upon sending specific information, and determines the first transmission mode when a value of the counter reaches a first threshold value.

The counter can be used to record the number of times for which the first terminal device detects that there is resource allocation information, or the number of times for which no resource allocation information is detected.

In some implementations, the first threshold value may be preconfigured, configured by the network device, or configured by other terminal devices (such as the second terminal device), or may be determined by the first terminal device according to an attribute of data to-be-transmitted.

In some implementations, the attribute of data to-be-transmitted includes at least one of: a delay requirement of the data to-be-transmitted, quality of service (QOS) of the data to-be-transmitted, a QoS class identifier (QCI) of the data to-be-transmitted, and a vehicle to everything (V2X) 5G QoS identifier (V2X 5QI or VQI) value of the data to-be-transmitted.

In some implementations, the specific information includes any one of: a scheduling request (SR), a buffer status report (BSR), hybrid automatic repeat request (HARQ) negative acknowledgement (NACK), and HARQ acknowledgement (ACK).

In other implementations, the first terminal device determines the first transmission mode according to the counter as follows. The first terminal device adjusts the value of the counter according to a detection result of the resource allocation information. The first terminal device determines the first transmission mode when the value of the counter reaches the first threshold value.

The resource allocation information is used to determine a transmission resource which is used by the first terminal device for data transmission. The first terminal device, upon detecting that there is resource allocation information, can transmit data on the transmission resource indicated by the resource allocation information.

The resource allocation information may be sent by the network device, or may be sent by other terminal devices.

In some implementations, the first terminal device adjusts the value of the counter according to the detection result of the resource allocation information as follows. The first terminal device detects, in each slot or subframe, existence of the resource allocation information. The first terminal device adjusts the value of the counter by one when no resource allocation information is detected.

As an example, the counter can be used to record a consecutive number of times for which no resource allocation information is detected. When the consecutive number of times reaches the first threshold value, the first terminal device switches to the first transmission mode. In this scenario, each time no resource allocation information is detected, the value of the counter is adjusted by one. When the first terminal device detects that there is resource allocation information, the counter is restarted and the value of the counter is reset to be an initial value.

Alternatively, as another example, the counter can be used to record a total number of times for which no resource allocation information is detected. When the total number of times reaches the first threshold value, the first terminal device switches to the first transmission mode. In this scenario, each time no resource allocation information is detected, the value of the counter is adjusted by one. When the first terminal device detects that there is resource allocation information, the value of the counter remains unchanged.

In some implementations, the initial value of the counter may be preconfigured, configured by the network device, configured by other terminal devices (such as the second terminal device), or may be determined by the first terminal device according to the attribute of data to-be-transmitted.

For example, the first terminal device sends the specific information (such as NACK) and starts the counter in slot n, and detects, in each slot subsequent to slot n, existence of the resource allocation information. Suppose the initial value of the counter is zero and the first threshold value is three. If no resource allocation information is detected in slot n+1 by the first terminal device, the value of the counter is changed to one. If no resource allocation information is detected in slot n+2 by the first terminal device, the value of the counter changed to two. If no resource allocation information is detected in slot n+3 by the first terminal device, the value of the counter is changed to three, which reaches the first threshold value. In this case, the first terminal device switches to the first transmission mode.

For another example, the first terminal device sends the specific information (such as NACK) and starts the counter in slot n, and detects, in each slot subsequent to slot n, existence of the resource allocation information. Suppose the initial value of the counter is zero and the first threshold value is three. If no resource allocation information is detected in slot n+1 by the first terminal device, the value of the counter is changed to one. If no resource allocation information is detected in slot n+2 by the first terminal device, the value of the counter changed to two. However, if the first terminal device detects, in slot n+3, that there is resource allocation information, the value of the counter is reset to be zero. If no resource allocation information is detected in subsequent slot n+4 to slot n+6 by the first terminal device, the value of the counter is adjusted from zero to three. At this time, the first terminal device switches to the first transmission mode.

For another example, the first terminal device sends the specific information (such as NACK) and starts the counter in slot n, and detects, in each slot subsequent to slot n, existence of the resource allocation information. Suppose the initial value of the counter is zero and the first threshold value is three. If no resource allocation information is detected in slot n+1 by the first terminal device, the value of the counter is changed to one. If no resource allocation information is detected in slot n+2 by the first terminal device, the value of the counter changed to two. However, if the first terminal device detects, in slot n+3, that there is resource allocation information, the first terminal device stops counting. When the first terminal device sends again the NACK, the first terminal device starts the counter, and the initial value of the counter is zero.

For another example, the first terminal device sends the specific information (such as NACK) and starts the counter in slot n, and detects, in each slot subsequent to slot n, existence of the resource allocation information. Suppose the initial value of the counter is zero and the first threshold value is three. If no resource allocation information is detected in slot n+1 by the first terminal device, the value of the counter is changed to one. If no resource allocation information is detected in slot n+2 by the first terminal device, the value of the counter changed to two. However, if the first terminal device detects, in slot n+3, that there is resource allocation information, the value of the counter remains unchanged (that is, two). If no resource allocation information is detected in slot n+4 by the first terminal device, the value of the counter is adjusted from two to three. At this time, the first terminal device switches to the first transmission mode.

Alternatively, mode switching of the first terminal device can be achieved through a timer. For example, the first terminal device sends the specific information (such as NACK) and starts the timer, and detects, in each subsequent slot or subframe, whether there is resource allocation information. Suppose that a timing period of the timer is T. The first terminal device switches to the first transmission mode when no resource allocation information is detected before the timer expires (that is, before timing period T has elapsed), and/or the first terminal device restarts or stops the timer if the first terminal device detects that there is resource allocation information before the timer expires.

For another example, the timer can be used in combination with the counter. The first terminal device sends the specific information (such as NACK) and starts both the timer and the counter, and detects, in each subsequent slot or subframe, whether there is resource allocation information. Suppose that the timing period of the timer is T. The first terminal device switches to the first transmission mode when the number of times for which no resource allocation information is detected reaches the first threshold value before the timer expires, and/or the first terminal device does not perform mode switching and restarts the timer when the number of times for which no resource allocation information is detected does not reach the first threshold value when the timer expires. After the timer is restarted, the first terminal device detects, in a subsequent timing period T of the timer, whether there is resource allocation information. When the number of times for which no resource allocation information is detected reaches the first threshold value, the first terminal device switches to the first transmission mode.

Figure 5:
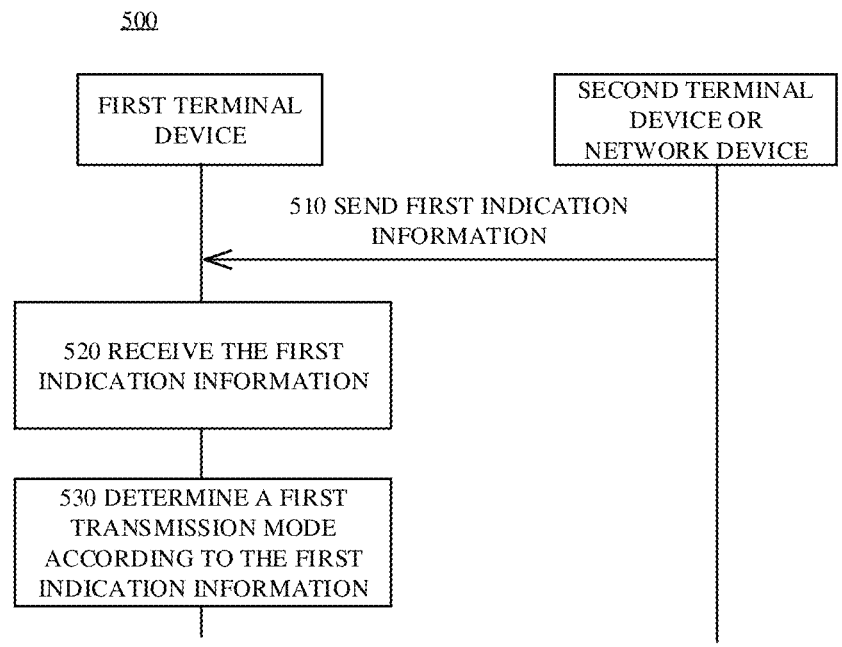
FIG. 5 is a flow interaction diagram of a method for data transmission according to other implementations.

FIG. 5 is a flow interaction diagram of a method for data transmission according to other implementations. The method illustrated in FIG. 5 may be implemented by a first terminal device and a second terminal device, or may be implemented by a first terminal device and a network device. The first terminal device may be, for example, terminal device 20, terminal device 30, or terminal device 40 illustrated in FIG. 1, FIG. 2, or FIG. 3. The second terminal device may be, for example, terminal device 20, terminal device 30, or terminal device 40 illustrated in FIG. 1, FIG. 2, or FIG. 3. The network device may be, for example, network device 10 illustrated in FIG. 1. FIG. 2, or FIG. 3. The method is applicable to D2D communication.

As illustrated in FIG. 5, the method includes some or all of the following operations.

At block 510, first indication information is sent to a first terminal device.

The first indication information is used to determine a first transmission mode or used to indicate stopping allocating transmission resource to the first terminal device.

At block 520, the first terminal device receives the first indication information.

At block 530, the first terminal device determines the first transmission mode according to the first indication information.

In some implementations, the first transmission mode is different from a second transmission mode which is used by the first terminal device before the first indication information is sent.

In some implementations, the first transmission mode may be Mode 2d described above. In the first transmission mode, a terminal device can autonomously select a transmission resource.

The second transmission mode may be Mode 2a described above. In the second transmission mode, a terminal device can determine a transmission resource according to resource allocation information from other terminal devices.

In other implementations, the second transmission mode may be Mode 1 described above. In the second transmission mode, a terminal device can determine a transmission resource according to resource allocation information of a network device.

According to implementations herein, a second terminal device or the network device sends the first indication information to the first terminal device, to instruct the first terminal device to switch to the first transmission mode, such that the first terminal device can determine a proper transmission mode according to the first indication information, which is possible to efficiently transmit data even if communication environment changes.

In some implementations, the network device sends the first indication information to the first terminal device.

In some implementations, the first indication information may be carried in, for example, RRC signaling, MAC signaling, a broadcast message, or DCI.

In some implementations, the first indication information further includes identifier information of a terminal device which is configured to allocate a transmission resource to the first terminal device.

The identifier information carried in the first indication information may be identifier information of a terminal device which stops allocating transmission resource to the first terminal device, or may be identifier information of a terminal device which is configured to allocate a transmission resource to the first terminal device in a transmission mode to-be-used (that is, the first transmission mode).

The identifier information may be L2 ID of the terminal device or RNTI, where RNTI may be C-RNTI or V-RNTI.

The identifier information of the terminal device may be carried in second indication information, where the second indication information is different from the first indication information.

In other implementations, the second terminal device sends the first indication information to the first terminal device.

In some implementations, the second terminal device may be, for example, a terminal device which is configured to allocate a transmission resource to the first terminal device. The terminal device which is configured to allocate a transmission resource to the first terminal device may be a group header of a communication group to which the first terminal device belongs, or may be other terminal devices in the communication group.

In some implementations, the first indication information is sent to the first terminal device at block 510 as follows. A first SL channel is sent to the first terminal device, where the first indication information is carried in the first SL channel.

In some implementations, the first SL channel includes any one of: a PSCCH, a PSSCH, and a PSBCH.

In other implementations, the first indication information is sent to the first terminal device at block 510 as follows. An S-RRC signal is sent to the first terminal device, where the first indication information is carried in the S-RRC signal.

For details of the process of sending the first indication information by the second terminal device or by the network device, reference can be made to description of the first terminal device in FIG. 4, which will not be repeated herein for the sake of simplicity.

Various implementations and/or technical features of the various implementations may be implemented in any combination with each other without conflict, and technical solutions thus obtained shall also fall within the protection cope of the disclosure.

It should be understood that, in various implementations described herein, the magnitude of a sequence number of each process does not mean an order of execution, and the order of execution of each process should be determined by its function and an internal logic and shall not constitute any limitation to an implementation process of implementations.

Communication methods of implementations have been described in detail in the foregoing implementations. The following will describe apparatuses/devices of implementations in connection with FIG. 6 to FIG. 9. Technical features described in the foregoing method implementations can be applied to the following apparatus/device implementations.

Figure 6:
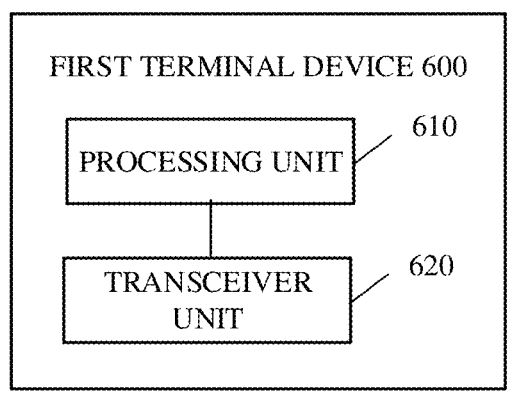
FIG. 6 is a schematic block diagram of a first terminal device according to implementations.

FIG. 6 is a schematic block diagram of a terminal device 600 according to implementations. The terminal device is applicable to D2D communication. The terminal device is operable as a first terminal device. As illustrated in FIG. 6, the first terminal device 600 includes a processing unit 610 and a transceiver unit 620. The processing unit 610 is configured to determine a first transmission mode. The transceiver unit 620 is configured to perform data transmission using the first transmission mode determined by the processing unit 610.

As such, by flexibly determining a proper transmission mode, the first terminal device can still transmit data efficiently even if communication environment changes.

In some implementations, the first transmission mode is different from a second transmission mode which is used by the first terminal device before the first transmission mode is determined.

In some implementations, the transceiver unit 620 is further configured to receive first indication information, where the first indication information is used to determine the first transmission mode or used to indicate stopping allocating transmission resource to the first terminal device. The processing unit 610 is configured to determine the first transmission mode according to the first indication information.

In some implementations, the transceiver unit 620 is configured to receive the first indication information sent by a second terminal device.

In some implementations, the second terminal device is a group header of a communication group to which the first terminal device belongs.

In some implementations, the second terminal device is configured to allocate a transmission resource to the first terminal device.

In some implementations, the transceiver unit 620 is configured to receive a first SL channel sent by the second terminal device, where the first indication information is carried in the first SL channel.

In some implementations, the first SL channel includes any one of: a PSCCH, a PSSCH, and a PSBCH.

In other implementations, the transceiver unit 620 is configured to receive an S-RRC signal sent by the second terminal device, where the first indication information is carried in the S-RRC signal.

In other implementations, the transceiver unit 620 is configured to receive the first indication information sent by a network device.

In some implementations, the first indication information is carried in RRC signaling, MAC signaling, a broadcast message, or DCI.

In some implementations, the first indication information further includes identifier information of a terminal device which is configured to allocate a transmission resource to the first terminal device.

In some implementations, the processing unit 610 is configured to determine the first transmission mode according to a counter.

In some implementations, the processing unit 610 is configured to start the counter when specific information is sent, and determine the first transmission mode when a value of the counter reaches a first threshold value.

In some implementations, the specific information includes any one of: an SR, a BSR, HARQ ACK, and HARQ NACK.

In other implementations, the processing unit 610 is configured to operate as follows. The processing unit 610 is configured to adjust the value of the counter according to a detection result of resource allocation information. The processing unit 610 is configured to determine the first transmission mode when the value of the counter reaches the first threshold value.

In some implementations, the processing unit 610 is configured to operate as follows. The processing unit 610 is configured to detect in each slot existence of the resource allocation information. The processing unit 610 is configured to adjust the value of the counter by one when no resource allocation information is detected.

In some implementations, an initial value and/or the first threshold value of the counter is preconfigured, configured by the network device, configured by other terminal devices, or determined according to an attribute of data to-be-transmitted.

In some implementations, the attribute of data to-be-transmitted includes at least one of: a delay requirement of the data to-be-transmitted, QoS of the data to-be-transmitted, a QCI of the data to-be-transmitted, and a VQI value of the data to-be-transmitted.

In some implementations, in the first transmission mode, a terminal device autonomously selects a transmission resource. In the second transmission mode, a terminal device determines a transmission resource according to resource allocation information from other terminal devices.

In other implementations, in the first transmission mode, a terminal device autonomously selects a transmission resource. In the second transmission mode, a terminal device determines a transmission resource according to resource allocation information from the network device.

It should be understood that, the terminal device 600 can implement operations performed by the first terminal device in the method 400, which will not be repeated herein for the sake of simplicity.

Figure 7:
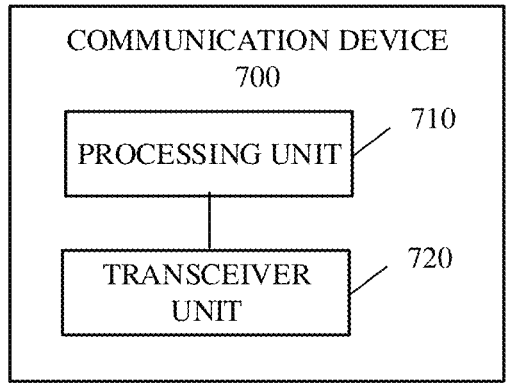
FIG. 7 is a schematic block diagram of a communication device according to implementations.

FIG. 7 is a schematic block diagram of a communication device 700 according to implementations. The communication device is applicable to D2D communication. The communication device 700 is operable as a second terminal device or a network device. As illustrated in FIG. 7, the communication device 700 includes a processing unit 710 and a transceiver unit 720. The processing unit 710 is configured to generate first indication information, where the first indication information is used to determine a first transmission mode or used to indicate stopping allocating transmission resource to a first terminal device. The transceiver unit 720 is configured to send to the first terminal device the first indication information generated by the processing unit.

Therefore, the first indication information is sent to the first terminal device, such that the first terminal device can determine a proper transmission mode, and as such, the first terminal device can still transmit data efficiently even if communication environment changes.

In some implementations, the first transmission mode is different from a second transmission mode which is used by the first terminal device before the first indication information is sent.

In some implementations, the communication device is operable as a second terminal device. The transceiver unit 720 is configured to send the first indication information to the first terminal device.

In some implementations, the second terminal device is a group header of a communication group to which the first terminal device belongs.

In some implementations, the second terminal device is configured to allocate a transmission resource to the first terminal device.

In some implementations, the transceiver unit 720 is configured to send a first SL channel to the first terminal device, where the first indication information is carried in the first SL channel.

In some implementations, the first SL channel includes any one of: a PSCCH, a PSSCH, and a PSBCH.

In other implementations, the transceiver unit 720 is configured to send an S-RRC signal to the first terminal device, where the first indication information is carried in the S-RRC signal.

In other implementations, the communication device is operable as a network device. The transceiver unit 720 is configured to send the first indication information to the first terminal device.

In some implementations, the first indication information is carried in RRC signaling, MAC signaling, a broadcast message, or DCI.

In some implementations, the first indication information further includes identifier information of a terminal device which is configured to allocate a transmission resource to the first terminal device.

In some implementations, in the first transmission mode, a terminal device autonomously selects a transmission resource. In the second transmission mode, a terminal device determines a transmission resource according to resource allocation information from other terminal devices.

In other implementations, in the first transmission mode, a terminal device autonomously selects a transmission resource. In the second transmission mode, a terminal device determines a transmission resource according to resource allocation information from the network device.

It should be understood that, the communication device 700 can implement operations performed by the second terminal device or the network device in the method 500, which will not be repeated herein for the sake of simplicity.

Figure 8:
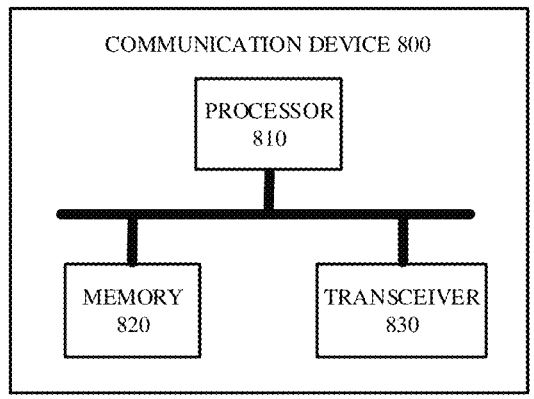
FIG. 8 is a schematic structural diagram of a communication device according to implementations.

FIG. 8 is a schematic structural diagram of a communication device 800 according to implementations. As illustrated in FIG. 8, the communication device 800 includes a processor 810. The processor 810 can invoke and execute computer programs stored in a memory to perform the method provided in implementations.

As illustrated in FIG. 8, the communication device 800 can further include the memory 820. The processor 810 can invoke and execute the computer programs stored in the memory 820 to perform the method provided in implementations.

The memory 820 may be a separate device independent of the processor 810, or may be integrated into the processor 810.

As illustrated in FIG. 8, the communication device 800 can further include a transceiver 830. The processor 810 can control the transceiver 830 to communicate with other devices, for example, to send information or data to other devices, or to receive information or data from other devices.

The transceiver 830 may include a transmitter and a receiver. The transceiver 830 may further include an antenna, where one or more antenna can be provided.

The communication device 800 may be the first terminal device of implementations, and the communication device 800 can implement the operations performed by the first terminal device described in the foregoing method implementations, which will not be repeated herein for the sake of simplicity.

Alternatively, the communication device 800 may be the second terminal device of implementations, and the communication device 800 can implement the operations performed by the second terminal device described in the foregoing method implementations, which will not be repeated herein for the sake of simplicity.

Alternatively, the communication device 800 may be the network device of implementations, and the communication device 800 can implement the operations performed by the network device described in the foregoing method implementations, which will not be repeated herein for the sake of simplicity.

Figure 9:
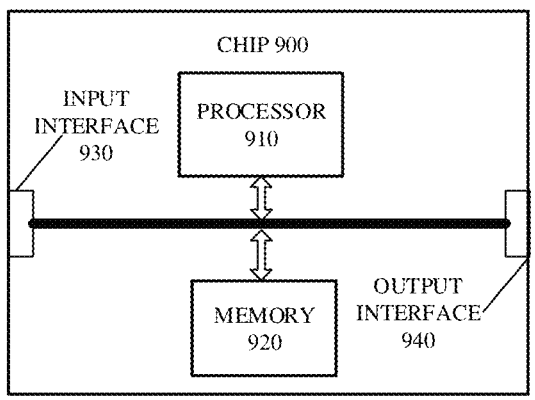
FIG. 9 is a schematic structural diagram of a chip according to implementations.

FIG. 9 is a schematic structural diagram of a chip according to implementations. As illustrated in FIG. 9, the chip 900 includes a processor 910. The processor 910 is configured to invoke and execute computer programs stored in a memory to perform the method provided in implementations.

As illustrated in FIG. 9, the chip 900 further includes the memory 920. The processor 910 can invoke and execute the computer programs stored in the memory 920 to perform the method provided in implementations.

The memory 920 may be a separate device independent of the processor 910, or may be integrated into the processor 910.

The chip 900 may further include an input interface 930. The processor 910 can control the input interface 930 to communicate with other devices or chips, for example, to acquire information or data sent by other devices or chips.

The chip 900 may further include an output interface 940. The processor 910 can control the output interface 940 to communicate with other devices or chips, for example, to output information or data to other devices or chips.

The chip is applicable to the first terminal device of implementations, and the chip can implement the operations performed by the first terminal device described in the foregoing method implementations, which will not be repeated herein for the sake of simplicity.

Alternatively, the chip is applicable to the second terminal device of implementations, and the chip can implement the operations performed by the second terminal device described in the foregoing method implementations, which will not be repeated herein for the sake of simplicity.

Alternatively, the chip is applicable to the network device of implementations, and the chip can implement the operations performed by the network device described in the foregoing method implementations, which will not be repeated herein for the sake of simplicity.

It should be understood that, the chip herein may also be referred to as a system-on-chip (SOC).

The processor referred to herein may be an integrated circuit chip with signal processing capabilities. During implementation, each step of the foregoing method implementations may be completed by an integrated logic circuit in the form of hardware or an instruction in the form of software in the processor. The processor may be a general-purpose processor, a digital signal processor (DSP), an application specific integrated circuit (ASIC), a field programmable gate array (FPGA), or other programmable logic devices, discrete gates or transistor logic devices, or discrete hardware components, which can implement or execute the methods, steps, and logic blocks disclosed in implementations. The general purpose processor may be a microprocessor, or the processor may be any conventional processor or the like. The steps of the method disclosed in implementations may be implemented through a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

The memory according to implementations may be a volatile memory or a non-volatile memory, or may include both the volatile memory and the non-volatile memory. The non-volatile memory may be a ROM, a PROM, an erasable programmable read only memory (erasable PROM, EPROM), an electrically erasable programmable read only memory (electrically EPROM, EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (synchlink DRAM, SLDRAM), and a direct rambus RAM (DR-RAM). The memory of the systems and methods described herein is intended to include, but is not limited to, these and any other suitable types of memory.

The above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

Figure 10:
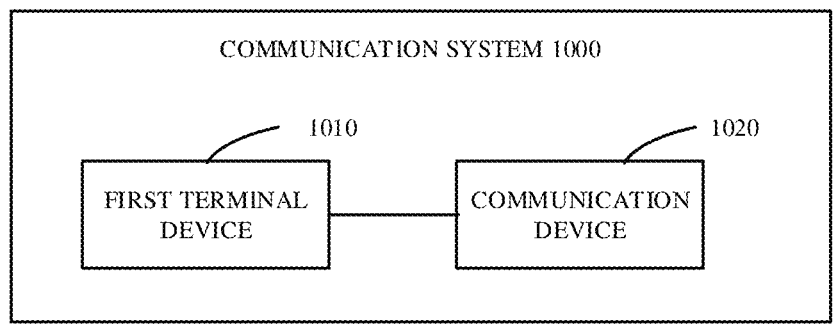
FIG. 10 is a schematic block diagram of a communication system according to implementations.

FIG. 10 is a schematic block diagram of a communication system 1000 according to implementations. As illustrated in FIG. 10, the communication system 1000 includes a first terminal device 1010 and a communication device 1020. The communication device 1020 is operable as a second terminal device or a network device.

The first terminal device 1010 is configured to operate as follows. The first terminal device 1010 is configured to determine a first transmission mode. The first terminal device 1010 is configured to perform data transmission using the first transmission mode.

The communication device 1020 is configured to send first indication information to the first terminal device, where the first indication information is used to determine the first transmission mode or used to indicate stopping allocating transmission resource to the first terminal device.

The first terminal device 1010 can implement operations performed by the first terminal device in the method 400. The first terminal device 1010 may be structured like the first terminal device 600 illustrated in FIG. 6, which will not be repeated herein for the sake of simplicity.

The communication device 1020 can implement operations performed by the second terminal device or the network device in the method 500. The communication device 1020 may be structured like the communication device 700 illustrated in FIG. 7, which will not be repeated herein for the sake of simplicity.

Implementations further provide a computer readable storage medium. The computer readable storage medium is configured to store computer programs. The computer readable storage medium is applicable to the first terminal device of implementations. The computer programs, when executed, are operable with a computer to implement the operations performed by the first terminal device described in the foregoing method implementations, which will not be repeated herein for the sake of simplicity. Alternatively, the computer readable storage medium is applicable to the second terminal device of implementations. The computer programs, when executed, are operable with a computer to implement the operations performed by the second terminal device described in the foregoing method implementations, which will not be repeated herein for the sake of simplicity. Alternatively, the computer readable storage medium is applicable to the network device of implementations. The computer programs, when executed, are operable with a computer to implement the operations performed by the network device described in the foregoing method implementations, which will not be repeated herein for the sake of simplicity.

Implementations further provide a computer program product. The computer program product includes computer program instructions. The computer program product is applicable to the first terminal device of implementations. The computer program instructions, when executed, are operable with a computer to implement the operations performed by the first terminal device described in the foregoing method implementations, which will not be repeated herein for the sake of simplicity. Alternatively, the computer program product is applicable to the second terminal device of implementations. The computer program instructions, when executed, are operable with a computer to implement the operations performed by the second terminal device described in the foregoing method implementations, which will not be repeated herein for the sake of simplicity. Alternatively, the computer program product is applicable to the network device of implementations. The computer program instructions, when executed, are operable with a computer to implement the operations performed by the network device described in the foregoing method implementations, which will not be repeated herein for the sake of simplicity.

Implementations further provide a computer program. The computer program is applicable to the first terminal device of implementations. The computer program, when executed by a computer, is operable with the computer to implement the operations performed by the first terminal device described in the foregoing method implementations, which will not be repeated herein for the sake of simplicity. Alternatively, the computer program is applicable to the second terminal device of implementations. The computer program, when executed by a computer, is operable with the computer to implement the operations performed by the second terminal device described in the foregoing method implementations, which will not be repeated herein for the sake of simplicity. Alternatively, the computer program is applicable to the network device of implementations. The computer program, when executed by a computer, is operable with the computer to implement the operations performed by the network device described in the foregoing method implementations, which will not be repeated herein for the sake of simplicity.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In addition, according to implementations, "B corresponding to (which corresponds to) A" means that B is associated with A, and B can be determined according to A. However, "B can be determined according to A" does not mean that B can be determined only according to A. and instead, B can also be determined according to A and/or other information.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one.

If the integrated units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for data transmission, being applicable to device to device (D2D) communication and comprising:
   determining, by a first terminal device, a first transmission mode according to a counter; and
   performing, by the first terminal device, data transmission using the first transmission mode;
   wherein determining, by the first terminal device, the first transmission mode according to the counter comprises:
   starting, by the first terminal device, the counter upon sending specific information, and determining the first transmission mode when a value of the counter reaches a first threshold value, wherein the specific information comprises one of: a scheduling request (SR), a buffer status report (BSR), hybrid automatic repeat request (HARQ) acknowledgement (ACK), or HARQ negative acknowledgement (NACK).

2. The method of claim 1, wherein at least one of an initial value or the first threshold value of the counter is preconfigured, configured by a network device, configured by other terminal devices, or determined according to an attribute of data to-be-transmitted.

3. The method of claim 2, wherein the attribute of data to-be-transmitted comprises at least one of: a delay requirement of the data to-be-transmitted, quality of service (QoS) of the data to-be-transmitted, a QoS class identifier (QCI) of the data to-be-transmitted, or a vehicle to everything (V2X) 5G QoS identifier (VQI) value of the data to-be-transmitted.

4. The method of claim 1, wherein
   in the first transmission mode, a terminal device autonomously selects a transmission resource; and
   in a second transmission mode, a terminal device determines a transmission resource according to resource allocation information from a network device.

5. A terminal device being applicable to device to device (D2D) communication and being operable as a first terminal device, and the first terminal device comprising:
   at least one processor;
   a transceiver; and
   a memory storing instructions which, when executed by the at least one processor, cause the at least one processor to determine a first transmission mode according to a counter and cause the transceiver to perform data transmission using the first transmission mode determined by the at least one processor;
   wherein the at least one processor is configured to:
   start the counter when specific information is sent, and determine the first transmission mode when a value of the counter reaches a first threshold value; wherein the specific information comprises one of: a scheduling request (SR), a buffer status report (BSR), hybrid automatic repeat request (HARQ) acknowledgement (ACK), or HARQ negative acknowledgement (NACK).

6. The terminal device of claim 5, wherein at least one of an initial value or the first threshold value of the counter is preconfigured, configured by a network device, configured by other terminal devices, or determined according to an attribute of data to-be-transmitted.

7. The terminal device of claim 6, wherein the attribute of data to-be-transmitted comprises at least one of: a delay requirement of the data to-be-transmitted, quality of service (QoS) of the data to-be-transmitted, a QoS class identifier (QCI) of the data to-be-transmitted, or a vehicle to everything (V2X) 5G QoS identifier (VQI) value of the data to-be-transmitted.

8. The terminal device of claim 5, wherein
   in the first transmission mode, the terminal device autonomously selects a transmission resource; and
   in a second transmission mode, the terminal device determines a transmission resource according to resource allocation information from a network device.

9. A non-transitory computer readable storage medium, storing computer programs which, when executed by a computer, are operable with the computer to: determine a first transmission mode according to a counter and cause the transceiver to perform data transmission using the first transmission mode determined by the at least one processor;
   wherein when executed by the computer, the computer programs are further operable with the computer to:
   start the counter when specific information is sent, and determine the first transmission mode when a value of the counter reaches a first threshold value, wherein the specific information comprises one of: a scheduling request (SR), a buffer status report (BSR), hybrid automatic repeat request (HARQ) acknowledgement (ACK), or HARQ negative acknowledgement (NACK).

10. The non-transitory computer readable storage medium of claim 9, wherein at least one of an initial value or the first threshold value of the counter is preconfigured, configured by a network device, configured by other terminal devices, or determined according to an attribute of data to-be-transmitted.

11. The non-transitory computer readable storage medium of claim 10, wherein the attribute of data to-be-transmitted comprises at least one of: a delay requirement of the data to-be-transmitted, quality of service (QOS) of the data to-be-transmitted, a QoS class identifier (QCI) of the data to-be-transmitted, or a vehicle to everything (V2X) 5G QoS identifier (VQI) value of the data to-be-transmitted.

12. The non-transitory computer readable storage medium of claim 9, wherein when executed by the computer, the computer programs are further operable with the computer to:
    in the first transmission mode, autonomously select a transmission resource, and
    in a second transmission mode, determine a transmission resource according to resource allocation information from a network device.

\* \* \* \* \*